(12) United States Patent
Marx

(10) Patent No.: US 9,854,940 B2
(45) Date of Patent: Jan. 2, 2018

(54) BATTER-DIPPING PAN HOLDER FOR COMMERCIAL FRYER

(71) Applicant: Paul A. Marx, Roscommon, MI (US)

(72) Inventor: Paul A. Marx, Roscommon, MI (US)

( * ) Notice: Subject to any disclaimer, the term of this patent is extended or adjusted under 35 U.S.C. 154(b) by 0 days.

(21) Appl. No.: 15/040,146

(22) Filed: Feb. 10, 2016

(65) Prior Publication Data

US 2017/0224162 A1   Aug. 10, 2017

(51) Int. Cl.
  *A47J 37/10*   (2006.01)
  *A47J 37/12*   (2006.01)
  *A47J 47/16*   (2006.01)

(52) U.S. Cl.
  CPC ......... *A47J 37/1271* (2013.01); *A47J 37/108* (2013.01); *A47J 47/16* (2013.01)

(58) Field of Classification Search
  CPC ...... A47J 37/1271; A47J 37/129; A47J 37/10; A47J 37/00; A47J 37/108; A47J 37/12; A47J 37/1295; A47J 47/16
  USPC ........ 248/37.6, 37.3; 99/356, 339, 340, 448, 99/449; 126/9 R; 206/486, 564
  See application file for complete search history.

(56) References Cited

U.S. PATENT DOCUMENTS

| | | | | |
|---|---|---|---|---|
| 3,590,753 A * | 7/1971 | Blink | ....................... | A47B 3/06 108/155 |
| 4,991,266 A * | 2/1991 | Oetiker | ................. | F16L 33/035 24/20 CW |
| 5,228,159 A * | 7/1993 | Gurka | ....................... | B25F 1/00 7/105 |
| 5,678,531 A * | 10/1997 | Byers | .................. | A47J 37/0704 126/25 R |
| 7,188,617 B1 * | 3/2007 | O'Blenes | ................ | F24C 15/08 126/24 |
| 7,415,979 B1 * | 8/2008 | Macri | ................. | A47J 37/0763 126/25 R |
| 7,828,260 B2 * | 11/2010 | Hauser | ................. | A47B 23/043 248/447 |
| 8,176,841 B2 * | 5/2012 | Hatjopoulos | ........... | A47J 45/02 126/9 R |
| 9,357,879 B2 * | 6/2016 | Ortner | .................... | A47J 37/067 |
| 2005/0223952 A1 * | 10/2005 | Brewer | ............... | A47J 37/1271 108/152 |

(Continued)

OTHER PUBLICATIONS

US Foods, Grill Sidebar, advertisement, Sep. 2015, 2 pages, US Foods, U.S.

(Continued)

*Primary Examiner* — Nkeisha Smith
(74) *Attorney, Agent, or Firm* — Northern Michigan Patent Law, PLC

(57) ABSTRACT

A pan holder for supporting batter-dipping pans from the front edge of a restaurant type fryer, especially a flat bottom type fryer with a raised front edge. The pan holder comprises a frame with an opening for receiving the batter-dipping pan and supporting the upper flange of the pan, a rear hook edge configured to mate with the front raised edge of the fryer, and side brace panels for engaging the front face of the fryer. The holder includes finger holes in both sides of the frame, extending beyond the pan flange so that the pan can be lifted evenly out of the frame; utensil holders formed in the side brace panels; and a perforated and/or discontinuous rear hook edge configured to reduce heat transfer and increase drainage of hot oil.

8 Claims, 6 Drawing Sheets

(56) References Cited

U.S. PATENT DOCUMENTS

2006/0225725 A1* 10/2006 Rinaldo .............. A47J 37/0763
126/9 R
2008/0066734 A1* 3/2008 Bright .................. A47J 37/067
126/25 R
2009/0025702 A1* 1/2009 Hatjopoulos ....... A47J 37/0786
126/14

OTHER PUBLICATIONS

Grill Advantage, Grill Advantage, Twitter post, Nov. 19, 2015, 1 page, Grill Advantage (https://twitter.com/grilladvantage), U.S.
Marx, drawings of prior batter holder prototype put into public use, 2014, 2 pages, Paul A. Marx, U.S.

* cited by examiner

BATTER-DIPPING PAN HOLDER FOR COMMERCIAL FRYER

RELATED APPLICATIONS/PRIORITY BENEFIT CLAIM

Not applicable.

FIELD

The subject matter of the present application is in the field of batter-dipping pans of the type used in restaurant kitchens.

BACKGROUND

Commercial kitchens such as those in restaurants often employ large "flat bottom" fryers for frying foods like battered fish. Flat bottom fryers usually have an angled frying surface, shallower near the front edge and deepening gradually toward the rear of the fryer, with a raised front edge to help contain the oil as it expands during heating. A batter-dipping pan is commonly kept near the fryer, holding for example several quarts or more of batter in which food is dipped before frying. A common type of batter-dipping pan comprises a fairly deep rectangular stainless steel pan with an out-turned flange or lip extending around the upper end of the pan, well known to those skilled in the art.

It is important to keep the batter-dipping pan close to the fryer in order to minimize drips and spills as the battered food is removed from the pan and transferred to the fryer. However, because the fryer contains a significant amount of hot oil, it is also important to keep the dipping pan stable and in a location where the person dipping the food in the batter is protected from splash and heat.

One prior device is a batter-dipping pan holder supported on the front edge of the fryer in cantilever fashion. The prior holder comprised a rectangular frame with a rectangular opening sized to receive the body of the batter dipping pan, the lip of the batter dip pan resting on the outer frame or edge of the holder. While this prior holder was an improvement over earlier arrangements, it suffers some drawbacks, including difficulty in removing the pan for refills and cleaning; a tendency to allow too much heat to be transferred from the oil in the fryer to the holder and pan; and, because the holder juts out in front of the fryer, interference with the cook's ability to easily access utensils stored at the sides of the fryer.

BRIEF SUMMARY

I have invented an improved batter-dipping pan holder for mounting at the front of a commercial fryer of the type used in restaurant kitchens. The inventive holder solves the problems of the prior known pan holder, with the following improvements.

The holder comprises a rectangular horizontal frame with an opening configured to receive and hold a batter-dipping pan; a rear hook edge spaced from a rear edge of the frame, and extending downwardly to hook over the raised front edge of a fryer; and generally triangular side brace panels extending downwardly from the sides of the frame to support the weight of the frame and pan against the front of the fryer.

The first improvement comprises frame sides wider than the width of the pan's upper side flanges, with finger holes or depressions formed in the upper side surfaces. An inner portion of each finger hole extends into an inner pan-supporting portion of the respective upper side surface covered by the pan's flange, and an outer portion of each finger hole remains exposed on an outer free portion of the respective upper side surface. The finger holes allow a pan to be lifted easily and evenly out of the frame, especially important when the pan is full.

The second improvement comprises a utensil holder formed in the triangular side brace of the pan holder, comprising an upwardly bent or curved hook extending outwardly from the side brace. In the preferred form the utensil hook is formed from an outwardly-bent tab partially cut from the side brace, leaving an opening in the side brace underneath the utensil hook, which in the case of a metal pan holder helps keep the utensil hook and any utensils therein cool.

The third improvement comprises a perforated rear hook edge, with holes or slots that reduce heat transfer and promote draining of oil. In the preferred form, the rear hook edge has a discontinuous bottom edge, for example formed by slots or perforations that leave the solid portions of the bottom edge spaced from each other with air between them.

All portions of the inventive pan holder can be formed from a flat metal blank, making it economical and efficient to produce.

These and other features and advantages of the invention will become apparent from the detailed description below, in light of the accompanying drawings.

DETAILED DESCRIPTION

Figure 1:
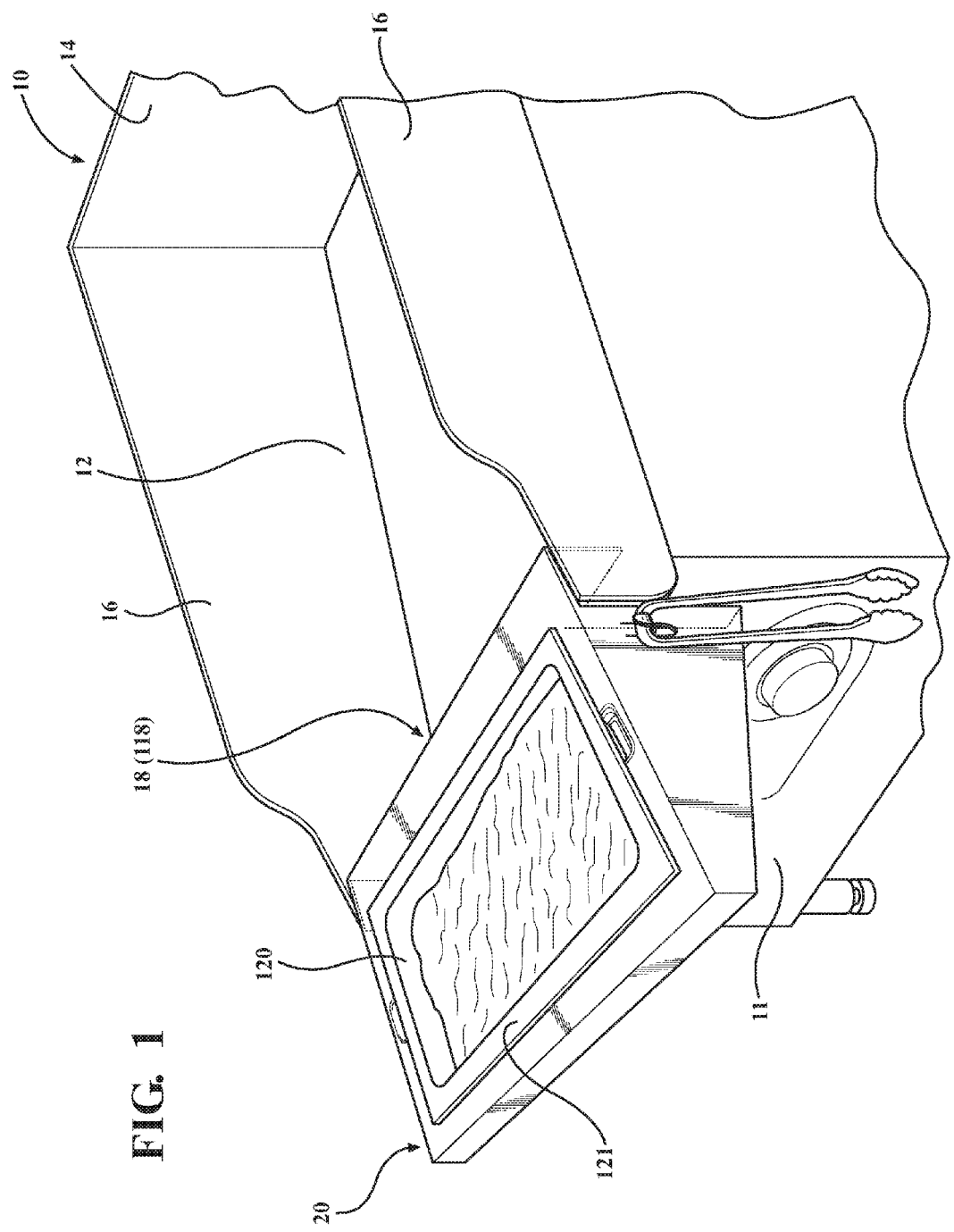
FIG. 1 is a perspective view of a known type of commercial fryer, and a batter dipping pan holder according to the invention secured to the fryer's front edge and holding a batter dipping pan.

Referring to FIG. 1, a restaurant or commercial fryer 10 of known type is illustrated schematically. Fryer 10 is a generally shallow fryer used to fry items such as battered fish filets in hot oil. Fryer 10 has a front face 11, a cooking surface 12, some or all of which is typically flat, a rear edge 14, sides 16, and a raised front edge 18. Cooking surface 12 is often angled or tapered downwardly from front edge 18 to rear edge 14, so that the oil is deeper toward the rear of the fryer and shallower toward the front of the fryer. This allows the cook to adjust the cooking depth for different pieces of food.

In some fryers the raised front edge 18 might comprise an oil-redirecting channel at the front edge of cooking surface 12 as shown in FIG. 1A, rather than a raised wall as illustrated in FIG. 1, and it should be understood that the invention is applicable to both types, since the front of the fryer would still have a raised front edge 18 raised relative to the bottom of any such channel. The thickness of the front edge 18 of the fryer may vary.

A pan holder according to the present invention is generally shown at 20, configured to hold a batter-dipping pan 120 of known type against the front edge of fryer 10. Batter-dipping pan 120 is typically formed of stainless steel or similar food-safe metal, has a peripheral lip or flange 121 extending around its upper end, and may hold a quantity of batter on the order of several quarts or more.

Figure 2:
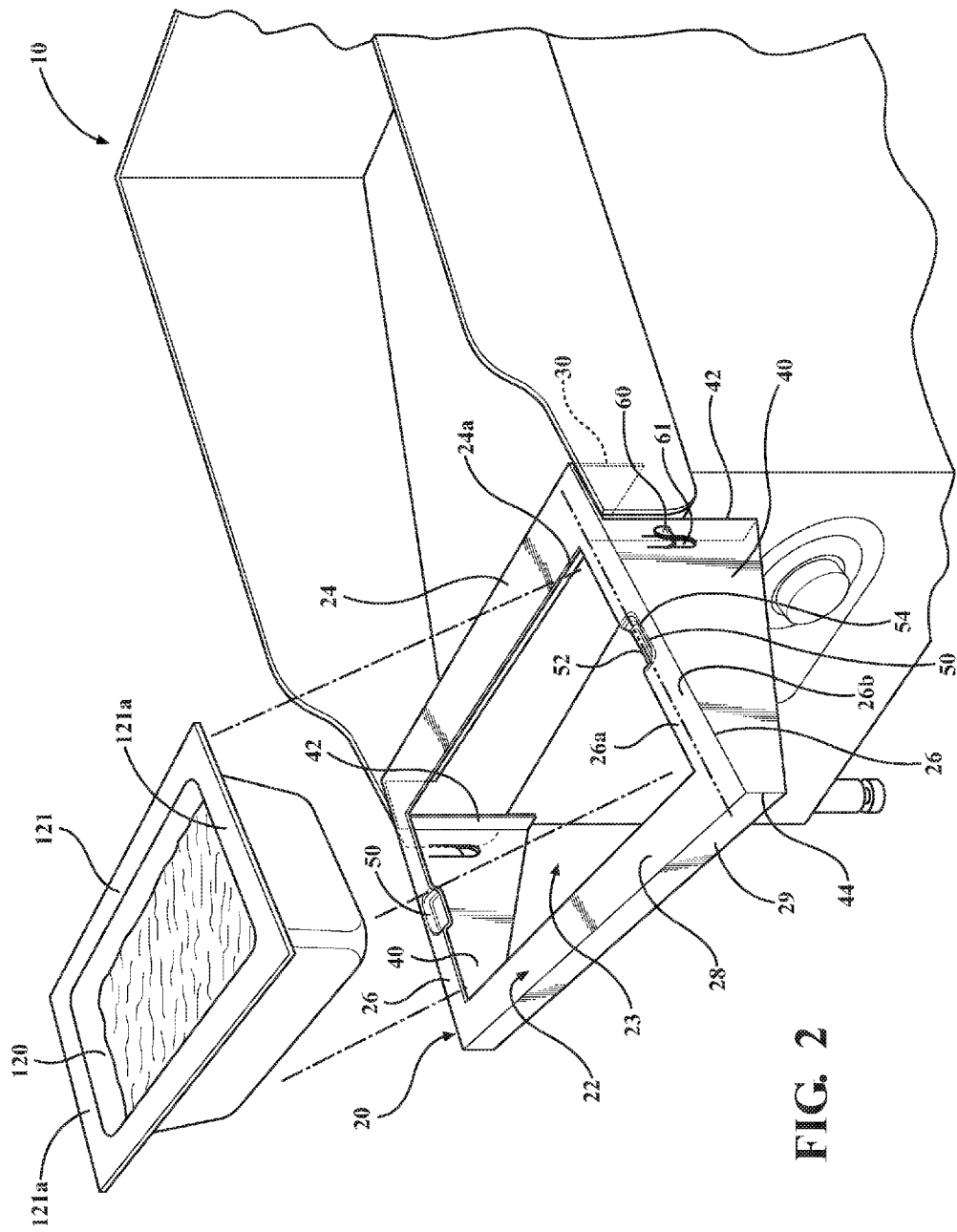
FIG. 2 is similar to FIG. 1, but shows a batter-dipping pan exploded from the holder.
Figure 3:
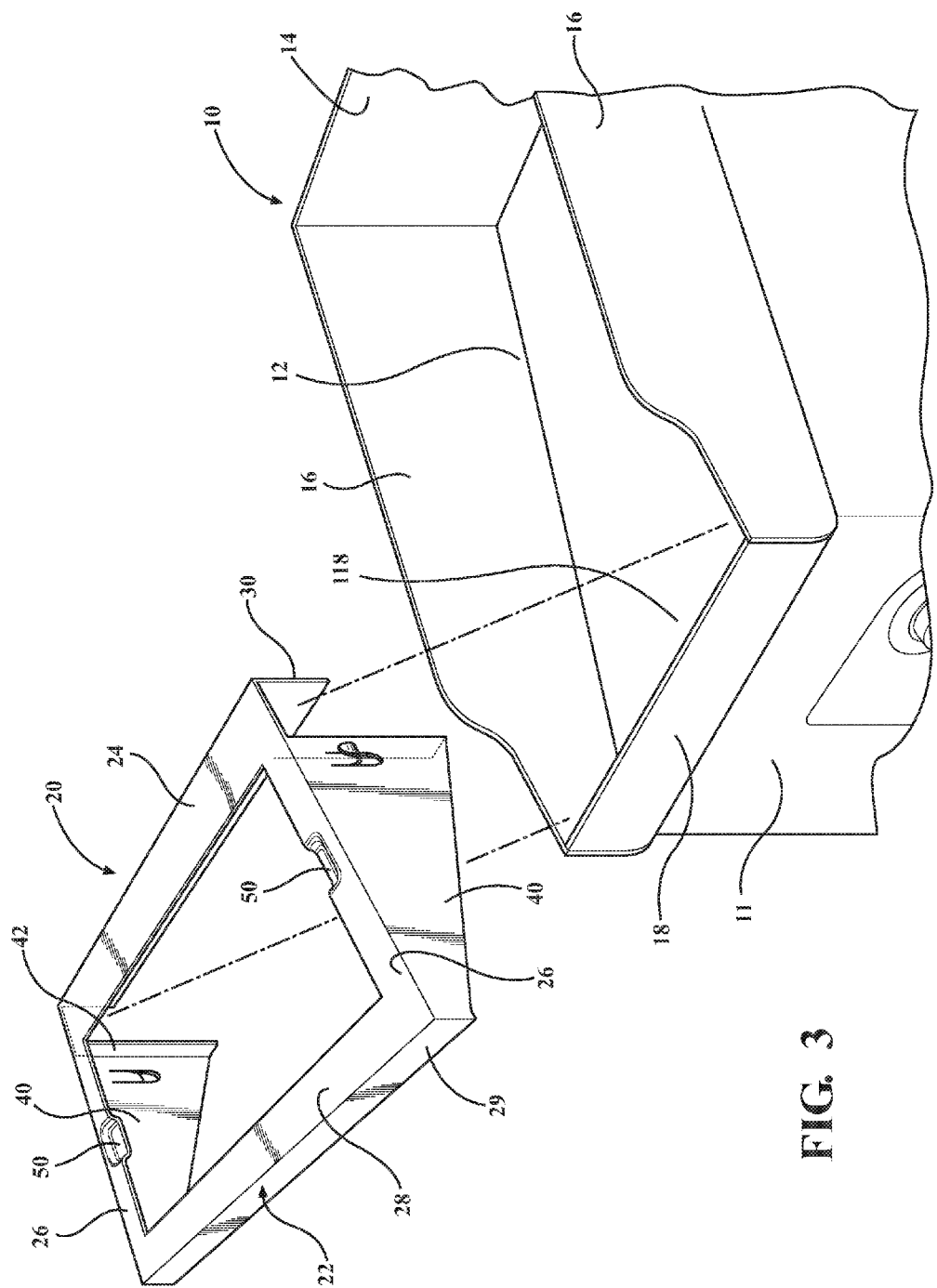
FIG. 3 is similar to FIG. 2, but further shows the holder in exploded assembly view relative to the fryer.

Pan holder 20 in the illustrated example is formed from a similar food-safe metal such as stainless steel. As best shown in FIG. 2, the pan holder 20 includes an opening 23 sized to receive the body of pan 120 therethrough, and a pan-holding frame 22 forming a generally flat horizontal support for the upper flange 121 on pan 120. Frame 22 includes a rear edge 24, sides 26, and a front edge 28 with an optional downturned lip 29. Frame 22 and opening 23 are illustrated as rectangular in the example, corresponding to the shape of typical batter-dipping pans such as 120, but it will be understood by those skilled in the art that variations in the shape of the pan and holder are possible.

Pan holder 20 further includes a rear fryer hook edge 30, comprising a downturned flange of metal spaced from the innermost end 24a of rear edge 24 of frame 22 and generally at right angles to the horizontal plane of frame 22. Fryer hook edge 30 generally has a height equal to or less than the front raised edge 18 of the fryer 10 with which it is used, for example on the order of two inches. The spacing of rear hook edge 30 from the rear edge 24 and/or the side bracing panels described below may vary according to the thickness of the front edge 18 of the fryer.

Pan holder 20 further includes side brace panels 40, in the illustrated example having a generally triangular shape, with longer bases 42 tapering toward a point or shorter front edge 44 to provide clearance for a cook's legs when standing near the fryer. The rear edges of side braces 40 are spaced from the fryer hook edge 30 a distance corresponding approximately to the distance between the raised front edge 18 and the front face 11 of fryer 10, in order to brace frame 22 as closely as possible to actual horizontal when attached to the fryer. Due to the differences in the dimensions of different fryers, in particular the thickness of front edge 18, there may be some variation from horizontal in the attached position of the frame 22, provided that batter does not spill over the sides of the pan 120 in holder 20.

The upper horizontal sides 26 of frame 22 are provided with finger holes 50, in the illustrated example openings or depressions cut or stamped from the metal of the frame. Whether finger holes 50 are formed as depressions or actual holes through the upper surface of sides 26 will depend on preference and on the thickness of the metal. Sides 26 have a width greater than the width of the corresponding side portions 121a of flange 121 on pan 120, such that each side includes an inner pan-holding portion 26a shown to the inside of the dotted line P marking the edge of pan flange 121, and an outer free portion 26b shown to the outside of dotted line P. Finger holes accordingly 50 have inner ends 52 that extend into the inner pan-holding portions 26a of frame sides 22, and outer ends 54 that extend into the outer free portions 26b of frame sides 22. Inner ends 52 of the finger holes may be extended to interrupt the inner side of the frame side 22, although it is preferred that the holes leave a significant width of uninterrupted metal on either side so that the strength of the sides 22 is not compromised.

When pan 120 is held in frame 22, as best shown in FIG. 1, the outer ends 54 of finger holes 50 are exposed so that a finger or utensil can be inserted under the flange 121 of the pan. This allows a cook to easily and evenly lift pan 120 from holder 20, even with gloved or mitted fingers, without having to tilt the pan and possibly spill batter.

It will be understood that while two finger holes 50 are illustrated in the example, one hole on each side of the frame, the number and size of finger holes 50 can vary.

As shown in FIGS. 1-4, side braces 40 are equipped with utensil holding tabs or hooks 60, in the illustrated example formed by bending three-sided tabs cut from the sheet metal of the side braces and remaining attached at their base ends 60b. Hooks 60 are generally upwardly-bent, -angled, or -curved members sized to receive and hold utensils commonly used for frying. The preferred, illustrated construction leaves a large opening 61 in the brace metal directly underneath each hook 60, and only a relatively small area of connection between the body of hook 60 and side brace 40, helping the hooks 60 and any utensils therein to stay cool.

Figure 4:
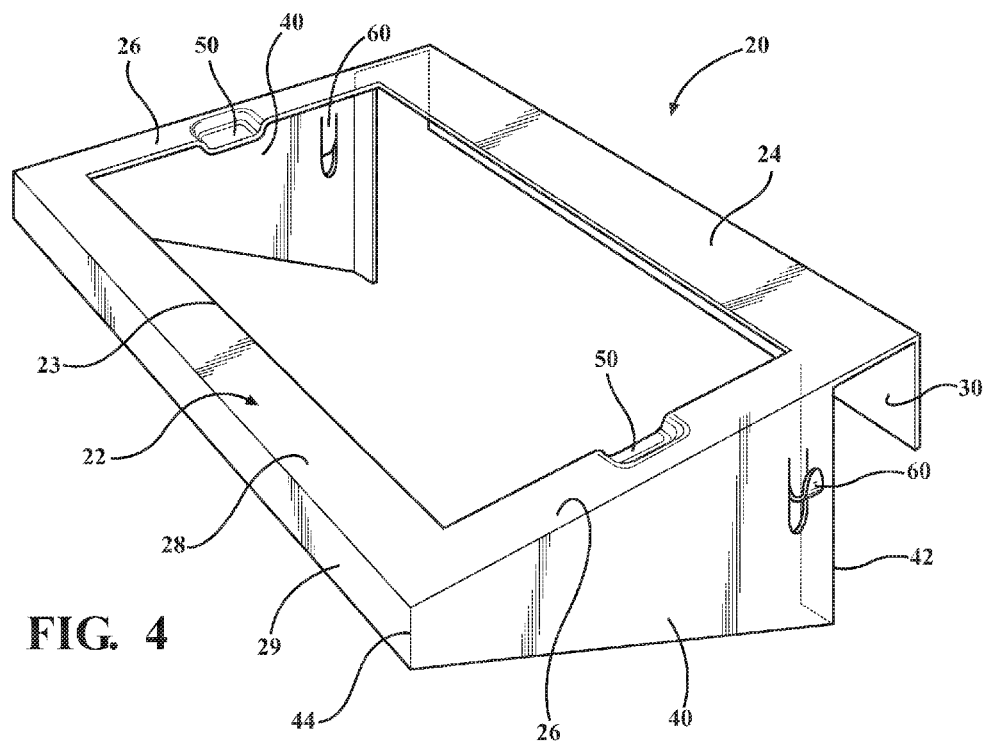
FIG. 4 is a perspective enlarged view of the holder of FIG. 1.
Figure 5:
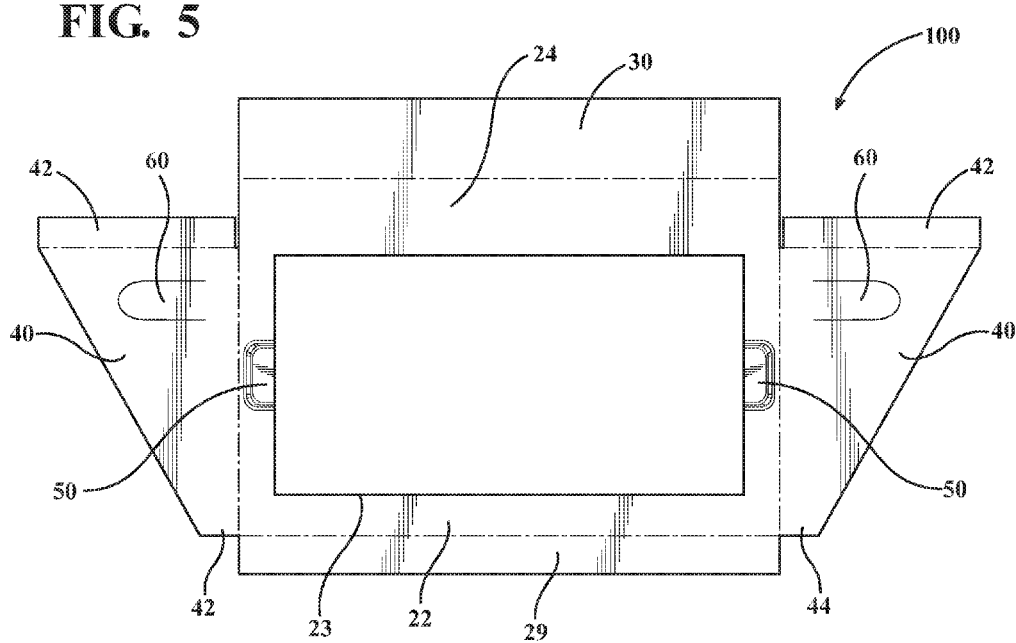
FIG. 5 is a top plan view of a flat metal blank from which the holder of FIG. 1 is formed.

Referring to FIGS. 4 and 5, in the preferred form pan holder 20 is stamped, cut, and/or formed from a flat blank of metal 100 shown in FIG. 5.

Figure 6:
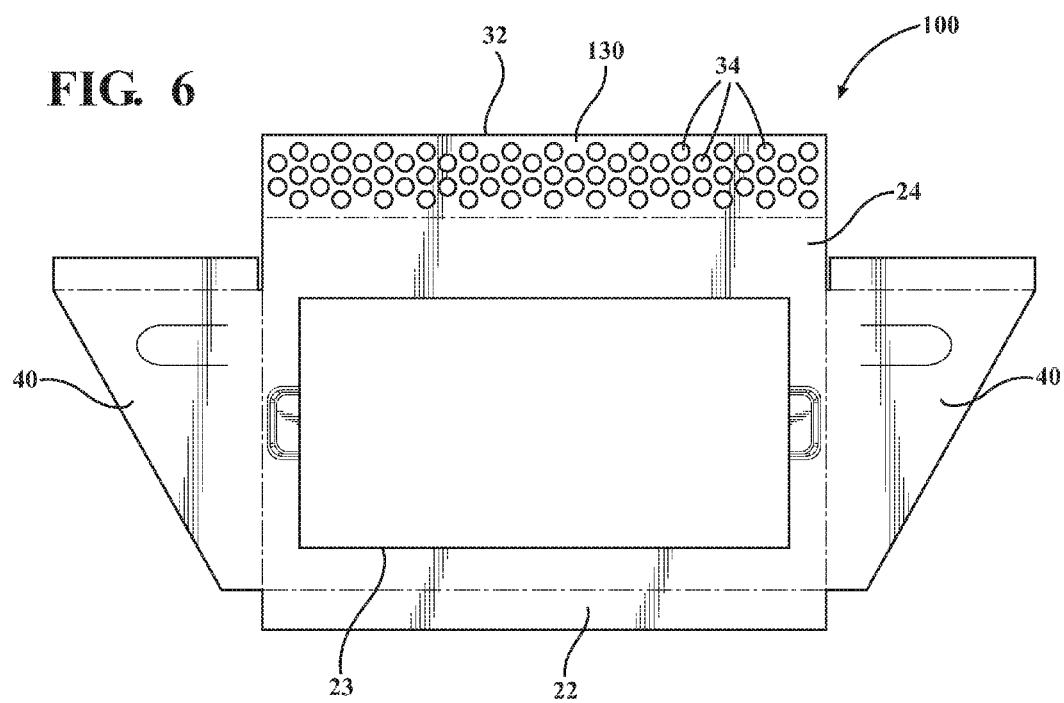
FIGS. 6 and 7 are top plan views of flat metal blanks from which a holder similar to that of FIG. 1 can be formed, with the modification of a perforated rear hook edge shown in two alternate forms.
Figure 7:
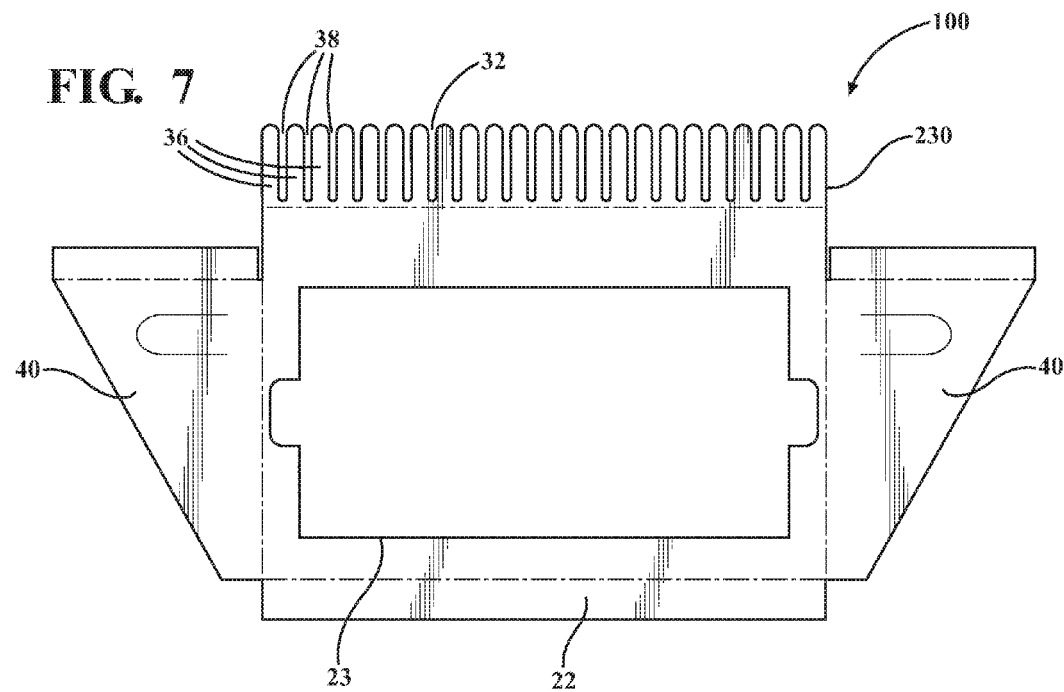
Figure 8:
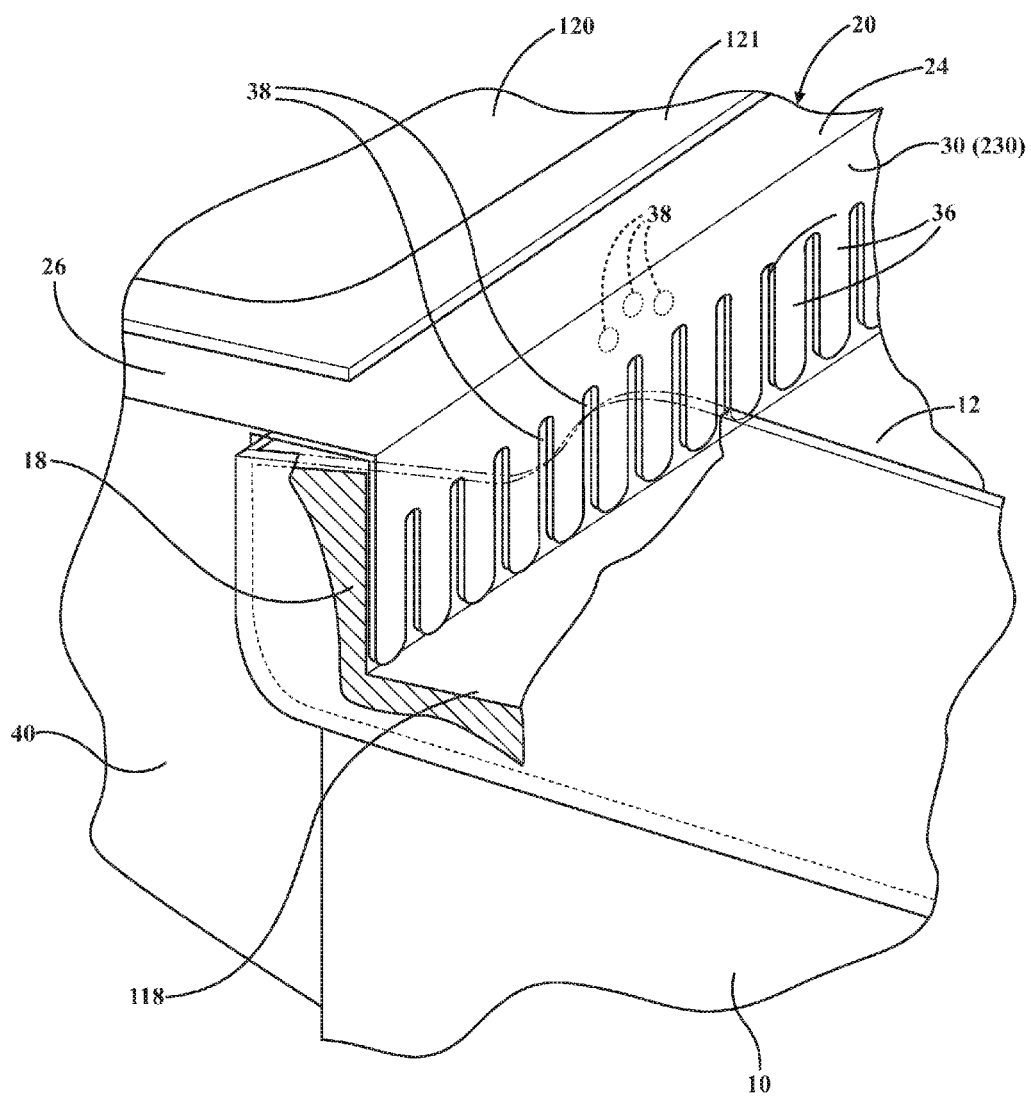
FIG. 8 is a rear perspective view of a detail of the pan holder of FIG. 7 where it engages the front edge of the fryer.

Referring next to FIGS. 6-8, pan holder 20 is shown with modified fryer hook edges 130 (FIG. 6) and 230 (FIG. 7) at the rear of the pan holder 20. Fryer hook edge 130 in FIG. 6 has a continuous lower edge 32, while the body of the hook edge includes a plurality of perforations or holes 34 that do not interrupt lower edge 32. Fryer hook edge 230 in FIG. 7 is provided with a discontinuous lower edge 32 interrupted by alternating openings 38 between tabs or portions of metal 36. In the illustrated example, interruptions 38 are formed by generally rectangular open-ended slots removed from the metal of hook edge 230. The size, spacing, and shape of the interruptions may vary, however, and may include rounded, triangular, and other shapes of varying contour and depth such as waves or scallops, which can all be considered "slots" or removed portions of the metal in between solid portions of metal at the lower edge 32. Holes 34 and interruptions 38 reduce the surface area of hook edges 130, 230 exposed to expanding hot oil at the front edge of the fryer, as shown for example in FIG. 8, and help keep the metal pan holder 20 cooler. For example, the metal surface area of the hook edge 130, 230 should preferably be significantly reduced by the slots/discontinuous edge/perforations 34, 38, for example on the order of 25% or more. Also, the slots and/or perforations should extend over a majority of the height of the hook edge 130, 230 from its lowermost edge toward the junction with rear holder edge 24, without weakening the junction. Further, lower edge interruptions 38 help drain oil from hook edge 230 as the hot oil in the fryer cools and contracts, or when the pan holder 20 is lifted from the fryer.

Description of Operation

In operation, pan holder 20 is used by attaching it to the front edge 18 of fryer 10, by securing hook edge 30 over the raised front edge 18 on the fryer, and lowering the rear edges 42 of side braces 40 into contact with the front face 11 of the fryer. Batter-dipping pan 120 can then be placed in frame 22 for convenient access to the batter when frying food. Utensils used for frying can be handily stored on utensil hooks 60 on the sides of holder 20. When it is desired to replace or refill batter-dipping pan 120, it is easily removed from holder 20 without tilting by inserting fingers into the outer exposed portions of finger holes 50 in the sides 26 of frame 22, and evenly lifting the pan from the frame.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A combination of a batter-dipping pan and a pan holder, the pan holder configured to be removably attached to a front of a fryer having a raised front edge, comprising:

the holder comprising a frame comprising a pan opening sized and shaped to receive a body of the batter-dipping pan therethrough, and further comprising generally flat horizontal sides and a front edge and a rear edge in a common plane surrounding the pan opening and defining a perimeter corresponding generally to a perimeter flange on an upper end of the body of the batter-dipping pan to support the batter-dipping pan thereon;

side brace panels extending downwardly generally perpendicular from the sides of the frame, each side brace panel comprising a rear vertical fryer-contacting edge configured to support the frame and the batter-dipping pan against the front of the fryer;

a rear hook edge spaced from the rear fryer-contacting edges of the side brace panels, the rear hook edge extending downwardly generally perpendicular to the frame and configured to hook over the front edge of the fryer; wherein, the holder further comprises a pair of finger holes, one finger hole formed in each side of the frame, each side of the frame being wider than the perimeter flange of the batter-dipping pan and comprising an inner pan-holding portion and an outer free portion, each finger hole having an inner covered portion extending into the inner pan-holding portion of an inner edge of a respective side and covered by the perimeter flange of the batter-dipping pan when the batter-dipping pan is supported on the inner pan-holding portion, and an outer open portion extending into the outer free portion of the respective side and left uncovered by the perimeter flange of the batter-dipping pan when the batter-dipping pan is supported on the inner pan-holding portion.

2. The combination of claim 1, further comprising a utensil holding hook extending outwardly from at least one of the side brace panels and spaced forwardly of the rear vertical fryer-contacting edge of the at least one of the side brace panels.

3. The combination of claim 2, wherein the utensil holding hook comprises a three-sided upwardly-angled tab removed and bent outwardly and upwardly from the at least one of the side brace panels and having a terminal free upper end spaced outwardly from the at least one of the side brace panels, and further comprising an inner end attached to the at least one of the side brace panels, and wherein an opening corresponding to the three-sided tab is formed in the at least one of the side brace panels immediately under the inner end of the three-sided tab and the terminal free upper end terminates at or above the inner end.

4. The combination of claim 1, wherein the pan holder is made from metal, and further wherein the rear hook edge comprises a planar wall comprising an upper edge adjacent and perpendicular to the rear edge of the frame, and a lower edge interrupted along substantially an entirety of its length by a plurality of spaced open-ended slots opening onto the lower edge and terminating below the upper edge.

5. The combination of claim 1, wherein the rear hook edge comprises a planar wall comprising an upper edge adjacent and perpendicular to the rear edge of the frame and a lower edge, and further comprises a plurality of perforations formed in the planar wall between the upper and lower edges.

6. The combination of claim 1, wherein the rear hook edge comprises a planar wall comprising an upper edge adjacent and perpendicular to the rear edge of the frame and a lower edge interrupted along substantially an entirety of its length by a plurality of spaced open-ended slots opening onto the lower edge and terminating below the upper edge and wherein the rear hook edge also comprises a plurality of perforations formed in the planar wall between the slots and the upper edge.

7. The combination of claim 1, wherein the pan holder is formed from a one-piece flat blank of metal.

8. The combination of claim 1, wherein each finger hole comprises a depression extending between the inner pan-holding portion and the outer free portion.

* * * * *